United States Patent [19]

Karim

[11] Patent Number: 5,195,052
[45] Date of Patent: Mar. 16, 1993

[54] CIRCUIT AND METHOD FOR PERFORMING INTEGER POWER OPERATIONS

[75] Inventor: Faraydon O. Karim, Round Rock, Tex.

[73] Assignee: International Business Machines Corporation, Armonk, N.Y.

[21] Appl. No.: 807,305

[22] Filed: Dec. 13, 1991

[51] Int. Cl.$^5$ .............................................. G06F 7/38
[52] U.S. Cl. .................................................. 364/753
[58] Field of Search ................................ 364/753, 754

[56] References Cited

U.S. PATENT DOCUMENTS

| | | | |
|---|---|---|---|
| 4,225,933 | 9/1980 | Monden | 364/715 |
| 4,229,801 | 10/1980 | Whipple | 364/748 |
| 4,410,956 | 10/1983 | Yoshida | 364/752 |
| 4,758,975 | 7/1988 | Omoda et al. | 364/748 |
| 4,787,056 | 11/1988 | Dieterich | 364/753 |

FOREIGN PATENT DOCUMENTS

| | | |
|---|---|---|
| 3931545 | 3/1990 | Fed. Rep. of Germany . |
| 1179327 | 9/1985 | U.S.S.R. . |
| 1246092 | 7/1986 | U.S.S.R. . |
| 1411740 | 7/1988 | U.S.S.R. . |

OTHER PUBLICATIONS

*IBM Technical Disclosure Bulletin*, vol. 14, No. 1, Jun. 1971, pp. 328–330, "Efficient Arithmetic Apparatus and Method".

*IBM Technical Disclosure Bulletin*, vol. 25, No. 1, Jun. 1982, pp. 171–173, "Exponential by Sequential Squaring".

*IBM Technical Disclosure Bulletin*, vol. 32, No. 7, Dec. 1989, pp. 222–223, "16-Bit Floating-Point Math in an 8-Bit Microprocessor".

*IBM Technical Disclosure Bulletin*, vol. 33, No. 1B, Jun. 1990, pp. 312–313, "Exponent Shift Count Logic".

*Primary Examiner*—Tan V. Mai
*Attorney, Agent, or Firm*—Thomas E. Tyson

[57] ABSTRACT

An arithmetic circuit for performing an integer power operation having a first register that is initially stored with integer power data, a second register stored with base data and a multiplier for multiplying the second register contents with a third register. A control circuit is provided for iteratively shifting the first register and for each iteration (1) selectively multiplying, according to data shifted from said first register, the second register data by the third register data and storing the results in the third register, and (2) multiplying the second register data by itself and storing the results back into the second register. These iterative steps are continued until the remaining data in the first register indicates that the arithmetic operation is complete, whereupon a completion signal is provided.

11 Claims, 3 Drawing Sheets

| R | C | N | A | M | CYCLE |
|---|---|---|---|---|---|
| 1 | - | $1101_2$ | $2_{10}$ | $1_{10}$ | 1 |
| 1 | 1 | $0110_2$ | $4_{10}$ | $2_{10}$ | 2 |
| 1 | 0 | $0011_2$ | $16_{10}$ | $2_{10}$ | 3 |
| 1 | 1 | $0001_2$ | $256_{10}$ | $32_{10}$ | 4 |
| 0 | 1 | $0000$ | $256_{10}$ | $8192_{10}$ | 5 |

FIG. 3

CIRCUIT AND METHOD FOR PERFORMING INTEGER POWER OPERATIONS

TECHNICAL FIELD

The present invention relates generally to data processing systems and, more specifically, to arithmetic circuitry that performs integer power operations.

BACKGROUND ART

Integer power arithmetic is often required in data processing systems. Commonly, the execution of the integer power function is accomplished by using the existing arithmetic circuitry that traditionally just performs additions and subtractions. In these traditional arithmetic functional units, algorithms are performed in software to perform a multiplication operation by performing a series of additions. Multiple multiplication operations are performed to execute the integer power function. More recent data processing systems include special purpose arithmetic units. Some special purpose arithmetic units include multiplier circuitry. Integer power functions are accomplished with the multiplier circuit by repetitively multiplying a base number itself in accordance with the exponent.

However, recent systems have included circuitry especially dedicated to performing integer power functions. SU 1179327 (Abstract only available) entitled, "Digital Data-Processing Exponential Function Generator has Computing Unit Outputs From Base and Exponent Registers to AND-GATES and OR-GATES With Output-to-Output Multipliers", discloses an exponential functional circuit where the exponent, in binary form, controls multiplication of the base.

SU 1246092 (Abstract only available) entitled, "Digital Computing Powering APPTS has Exponent Coder Controlling Passage of Conjunctions From Argument Digital Product Coders to Output Adder", discloses an arithmetic circuit include an adder and a multiplier.

*IBM Technical Disclosure Bulletin* Vol. 14, No. 1, June, 1971, pp. 328-330, entitled "Efficient Arithmetic Apparatus and Method", discloses an arithmetic circuit that performs exponential logarithmic quotient and square root functions.

*IBM Technical Disclosure Bulletin*, Vol. 25, No. 1, June, 1982 pp. 171-173, entitled "Exponential by Sequential Squaring", discloses an algorithm for performing exponential operations.

U.S. Pat. No. 4,225,933 to Monden filed Nov. 16, 1978 and issued Sep. 30, 1980, entitled "Exponential Function Computing Apparatus", discloses a data shifting and adding circuit to perform exponential functions.

U.S. Pat. No. 4,229,801 to Whipple, filed Dec. 11, 1978 and issued Oct. 21, 1980, entitled "Floating Point Processor Having Concurrent Exponent/Mantissa Operation", discloses an arithmetic unit that performs exponent/sign related calculations concurrently with mantissa related operations in floating point arithmetic.

U.S. Pat. No. 4,410,956 to Yoshida, filed Mar. 30, 1981 and issued Oct. 18, 1983, entitled "Exponential Operation Device", discloses an exponential arithmetic circuit that determines whether the base parameter is positive or negative and whether the exponential parameter is an integer.

U.S. Pat. No. 4,758,975 to Omoda et al. filed Dec. 11, 1985 and issued Jul. 19, 1988, entitled "Data Processor Capable of Processing Floating Point Data With Exponent Part of Fixed or Variable Length", discloses a data processor with a latch for latching in a floating point register floating point exponent data.

DE 3931545 entitled, "Floating Point Processor—has Adder Subtracter Handling Exponent Part for Improved Execution of Multiplication and Division", provides circuitry to perform multiplication and division in addition to addition and subtraction.

*IBM Technical Disclosure Bulletin* Vol. 32 No. 7, December, 1989, pp. 222-223, entitled "16-Bit Floating-Point Math in an 8-Bit Microprocessor", discloses a program that performs a 16-bit floating point mathematical operation with a signed 8-bit exponent in an 8-bit microprocessor.

*IBM Technical Disclosure Bulletin*, Vol. 33, No. 1B, June, 1990. pp. 312-313, entitled "Exponent Shift Count Logic" discloses a circuit for performing exponent operations including an adder and shifter.

The object of the present invention is to provide an exponent circuit to quickly perform integer power operations.

DISCLOSURE OF THE INVENTION

In accordance with the present invention, an arithmetic circuit for performing an integer power operation is provided that includes a first register that initially stores an exponent a second register that initially stores a base value, a multiplier that multiplies data in a second register with data in a third register and controller that iteratively shifts the exponent data that is contained in the first register and for each operation (1) selectively multiplies in accordance with the data that is shifted out of the first register the contents of the second register with the third register storing the results back into the third register and (2) multiplying the second register by itself and storing the results back into the second register. The iterative multiplications are continued until the remaining data in the first register indicates that the arithmetic operation is complete wherein a completion signal is provided.

Also in accordance with the present invention, a method for performing an integer power operation in an arithmetic circuit having a first register, a second register and a multiplier circuit with a third register is provided. The method includes the steps of, (1) Storing integer power data in the first register; (2) Storing base data in the second register (3) Iteratively shifting the first register data; (4) For each iteration (A) selectively multiplying according to data shifted from the first register second register data by the third register data and storing the results in the third register and (B) multiplying the second register data by itself and storing the results back into the second register; and (5) providing a completion signal when the remaining data in the first register indicates that the integer power operation is complete.

BRIEF DESCRIPTION OF THE DRAWING

The foregoing and other objects, aspects and advantages of the invention will be better understood from the following Best Mode for Carrying Out the Invention with reference to the figures listed below, in which:

FIG. 3 is an example of the operation of the circuitry in FIG. 1.

BEST MODE FOR CARRYING OUT THE INVENTION

The present invention is an integer power arithmetic circuit that performs integer power operations very quickly in a hardware implementation.

Figure 1:
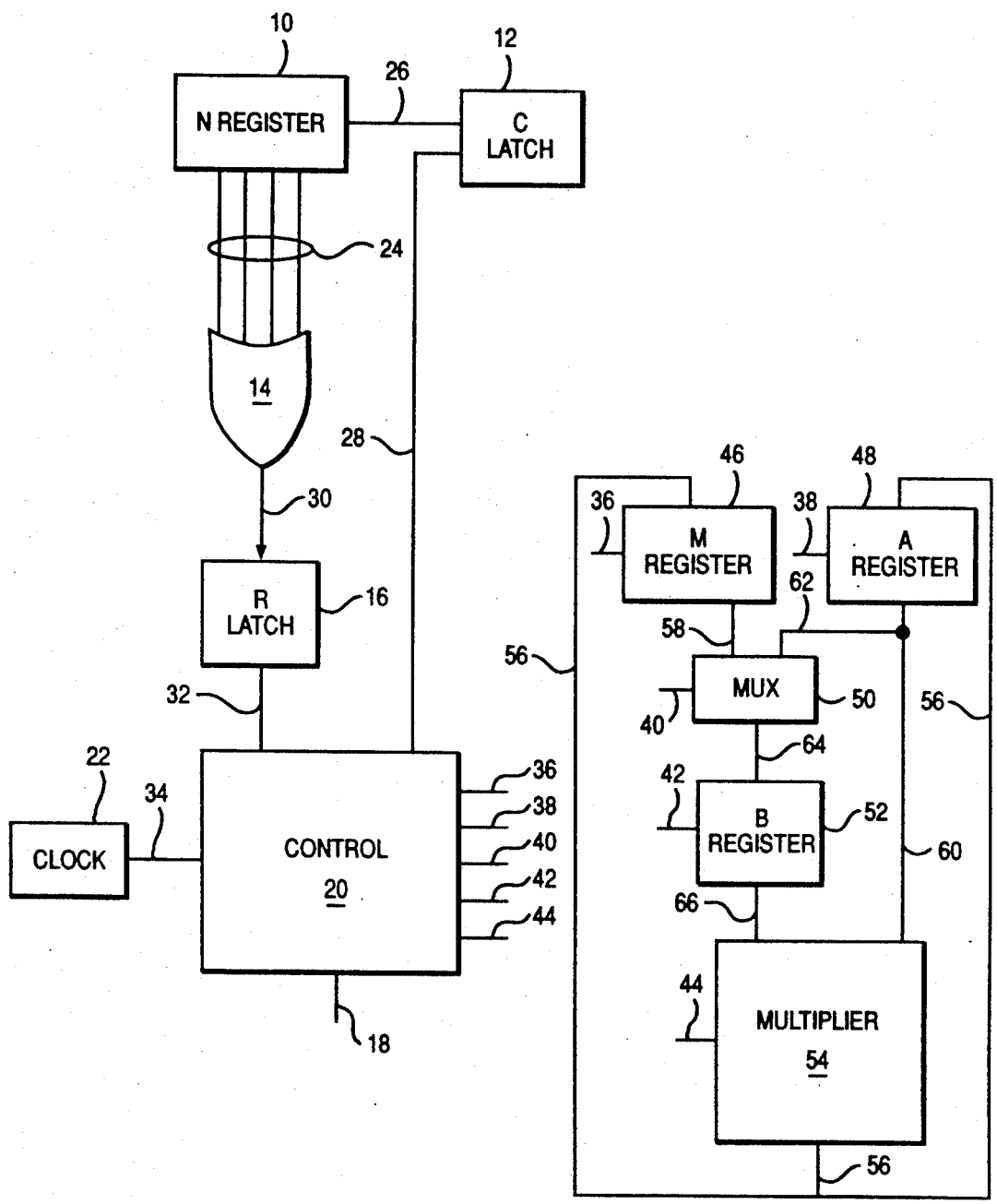
FIG. 1 is a block diagram of the integer power circuit.

FIG. 1 is a block diagram of the exponent circuit. The N register 10 initially contains the integer power. N register 10 is a shift register that iteratively shifts right one bit at a time, a bit out of the register along line 26 into the C latch 12. Also, the contents of N register 10 (each individual bit of the N register) is ORed through lines 24 and OR-GATE 14 to provide an output on line 30 to the R latch 16. As data is shifted right out of N register 10. 0's are shifted from the left in to replace the vacated binary positions. C latch 12 provides an input to the control circuit 20 by line 28. Likewise. R latch 16 provides an output to control 20 by line 32. Clock circuit 22 provides a clock input on line 34 into control circuit 20.

Control circuit 20, via lines 36, 38, 40, 42 and 44, controls the data flow through the multiplier 54. Specifically, M register 46 is used together with A register 48 to provide the integer power computation in accordance with the control lines 36, 38, 40, 42 and 44 from control circuit 20. Initially, the M register 46 contains a "1". The A register 48 initially contains the base value. Under the control of the control circuit 20 the contents of the M register 46 that has been loaded through the multiplexer 50 into the B register 52 is multiplied by the contents of the A register 48. Also under the control of control circuit 20, the contents of the A register 48 is placed through the multiplexer 50 into the B register 52 and multiplied by itself (the contents of the A register 48). Therefore the multiplexer 50 under the control of control circuit 20 can provide either the contents of the M register 46 via line 58 to the B register via line 64 or the contents of the A register 48 through line 62. The output of the B register is connected to the multiplier by line 66. Similarly, the output of the A register 48 is connected to the multiplier 54 by line 60. The output of the multiplier 54 is placed on line 56 and is provided to either the A register 48 or the M register 46 under the control of the control circuit 20. In other words, the control circuit 20 controls the data that is input into the M register 46 and A register 48.

Figure 2:
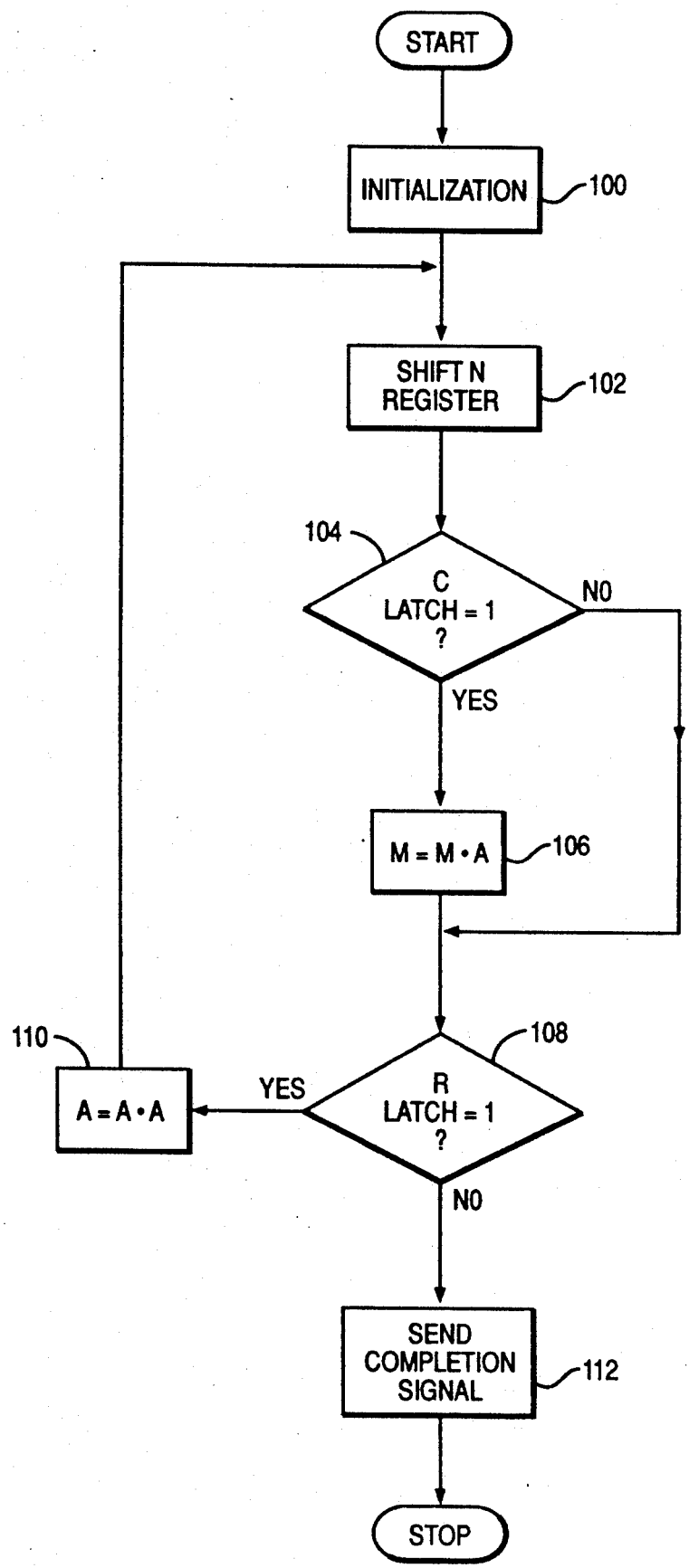
FIG. 2 is a flow chart illustrating the operation of the controller circuit in FIG. 1.

FIG. 2 illustrates in flow chart form the operation of the control circuit 20 together with the remaining circuitry of the integer power circuit. Step 100 is the initialization step. In step 100, the exponent is loaded into the N register 10. The base value is loaded into A register 48. A 1 is initially placed in the M register 46. In step 102 the contents of the N register 10 is shifted one bit position to the right. The bit that is shifted out of N register 10 is placed into C latch 12. In step 104, if the C latch content is a 1, then the contents of M register 46 is multiplied by the contents of the A register 48. This is accomplished in step 106.

Referring back to FIG. 1, step 106 is performed by loading the contents of M register 46 through line 58 through the multiplexer 50 over line 64 into the B register 52. Then multiplier 54 multiplies the contents of the B register 52 from line 66 with the contents of the A register 48 from line 60. The output of the multiplier 54 is provided on line 56 back the M register 46. The process then proceeds to step 108. Also, if the C latch contents is 0 (step 104). the process will continue directly to step 108 as shown.

In step 108, the controller determines if the contents of the R latch is 1. If the contents is a 1, then the A register is multiplied by itself in the multiplier 54. Specifically, this is accomplished by providing the contents of the A register 48 via line 62 through the multiplexer 50 and line 64 into the B register 52. Then the contents of the A register 48 on line 60 is multiplied with the contents of the B register 52 (which is the contents of the A register 48) on line 66 through the multiplier circuit 54. The output of this multiplication is placed on line 56 and returned to the A register 48. When step 110 is completed, the process returns to step 102 to shift the N register.

Returning to step 108, if the contents of the R latch is 0, then the process proceeds to step 112. At this point, a completion signal is sent from the control circuit on line 18.

A simple numeric example of how the circuitry in FIG. 1 functions may be helpful. This example is the computation of 213. This numerical example is illustrated in FIG. 3. Referring to FIG. 3, cycle 1 is the initialization cycle. During this cycle, the contents of the N register 10 is loaded with the exponent. In this example, the exponent is 1101 or 1310. The subscript 2 denotes that the 1101 is binary form. For the purposes of this example, only the contents of the N register 10 will be illustrated in binary form. The contents of the other registers will be identified in decimal form. In this example, the base parameter is 210, which is loaded in the A register 48 (note that the subscript 10 denotes decimal notation). A "1" is loaded into the M register 46. The ORed contents of the binary positions of the N register 10 is a 1 which is as illustrated in the R latch 16. The C latch 12 is a "don't care" since this is an initialization cycle. In cycle 2, the contents of the N register 10 is shifted one bit position to the right. The vacant bit position on the left is filled with a 0. The bit that is shifted out is a 1 that is placed in the C latch 12. According to the process illustrated in FIG. 2, since the C latch 12 contains a 1 the contents of the M register 46 is multiplied by the contents of the A register 48 and stored back into the M register 46. This results in a 2 being stored in the M register. Since the R latch 16 is still a 1. the contents of the A register 48 is multiplied by itself and stored back into the A register 48. Therefore, the contents of the A register 48 now becomes 4.

In cycle 3, the contents of the N register 10 is again shifted to the right. This time, the contents of the C latch 12 is a 0. Accordingly, the contents of the M register 46 does not change. Again, since at least one 1 is contained in the N register 10, the contents of the R latch 16 is again 1. Therefore, the contents of the A register 48 is multiplied by itself and stored back into the A register 48. This results in a 16 being stored in the A register 48.

In cycle 4, the contents of the N register 10 is again shifted by one. This time a 1 is placed in the C latch 12. As a result, the contents of the M register 46 is multiplied by the A register 48 and the results is placed back into the M register 46. Therefore, a 32 is stored in the M register 46. Since the contents of the R latch 16 is again a 1. the contents of the A register 48 is multiplied by itself and placed back into the A register 48. This results in 256 being stored into the A register 48.

In cycle 5, the contents of the N register 10 is again shifted one position to the right. This results in a 1 in the C latch 12 and the contents of the M register 46 is again multiplied by the contents of the A register 48 resulting in 8,192 being stored into the M register 46. Since the contents of the N register are all 0's, the contents of the R latch 16 will be a 0. Therefore, the control circuit 20 will send a completion signal. The results of the integer power operation is located in the M register 46 and is 8,192.

It should be obvious to those skilled in the art that if the integer power binary representation does not have 1's in the most significant bit positions, the controller 20 will indicate operation completion on line 18 as soon as N register 10 is all 0's or is in a null state. This results in the operation completion indication being provided before all bit positions in the N register 10 have been shifted since all required multiplications will have been completed.

While this invention has been described with reference to the illustrated embodiment, this description is not intended to be construed in a limiting sense. Various modifications of the illustrated embodiment, as well as other embodiments of the invention will become apparent to those persons skilled in the art upon reference to this description. It is, therefore, contemplated that these appended claims will cover any such modifications or embodiments as fall within the true scope of the invention.

I claim:

1. An arithmetic circuit for performing an integer power operation comprising:
   first register means for storing exponent data;
   second register means for storing base data;
   multiplier means for multiplying data in said second register means and a third register means; and
   control means for iteratively shifting first register means data, and for each iteration, (1) selectively multiplying, according to data shifted from said first register means, said second register means data by said third register means data storing results in the third register means, and (2) multiplying said second register means data by itself storing results in said second register means, until remaining data in said first register means indicates arithmetic operation completion and providing a completion signal thereupon.

2. An arithmetic circuit according to claim 1 wherein said control means further includes means for ORing the contents of the first register means data.

3. An arithmetic circuit according to claim 2 wherein said control means further includes a first latch to store the results from the ORing means.

4. An arithmetic circuit according to claim 3 wherein said control means further includes means to provide said completion signal when the contents of said first latch is a 0.

5. An arithmetic circuit according to claim 4 wherein said control means further includes a second latch to store data that has been shifted from said first register means.

6. An arithmetic circuit according to claim 5 wherein said multiplier means includes a results register for storing multiplication results.

7. An arithmetic circuit according to claim 6 wherein said multiplier means further includes a multiplexer connecting the results register and said second register to provide data to said third register.

8. A method for performing an integer power operation in an arithmetic circuit having a first register, a second register, a multiplier circuit with a third register, said method comprising the steps of:
   (1) storing exponent data in said first register;
   (2) storing base data in said second register;
   (3) iteratively shifting first register data;
   (4) for each iteration,
      (A) selectively multiplying, according to data shifting from said first register, said second register data by said third register data storing results in the third register, and
      (B) multiplying said second register data by itself storing results in said second register; and
   (5) providing a completion signal when remaining data in said first register indicates integer power operation completion.

9. A method according to claim 8 wherein step (1) further includes storing a 1 in the third register.

10. A method according to claim 9 wherein step (5) further includes ORing the remaining contents of the first register and providing the completion signal when the ORed results in a (0).

11. An arithmetic circuit for performing an integer power arithmetic operation comprising:
    first register means for storing exponent data;
    second register means for storing base data;
    multiplying means for multiplying said base data in said second register by a third register and maintaining an accumulative results in said third register; and
    control means for accumulating selective base data multiplications in said multiplying means according to data shifted from said first register means and providing a completion signal when the first register means data is in a null state.

* * * * *

UNITED STATES PATENT AND TRADEMARK OFFICE
CERTIFICATE OF CORRECTION

PATENT NO. : 5,195,052

DATED : Mar. 16, 1993

INVENTOR(S) : Faraydon O. Karim

It is certified that error appears in the above-identified patent and that said Letters Patent is hereby corrected as shown below:

Col. 2, line 26, please delete "exponent" and insert --exponent,--; and

Col. 6, line 36, please delete "in" and insert --is--.

Signed and Sealed this

Twenty-fifth Day of April, 1995

Attest:

BRUCE LEHMAN

Attesting Officer     Commissioner of Patents and Trademarks